J. V. A. v. A. Wemple,
Harvester Rake.

No. 19,393.  Patented Feb. 16, 1858.

UNITED STATES PATENT OFFICE.

JACOB V. A. WEMPLE AND ANDREW WEMPLE, OF CHICAGO, ILLINOIS.

IMPROVEMENT IN RAKING ATTACHMENTS FOR HARVESTERS.

Specification forming part of Letters Patent No. 19,393, dated February 16, 1858.

*To all whom it may concern:*

Be it known that we, JACOB V. A. WEMPLE and ANDREW WEMPLE, both of the city of Chicago, county of Cook, and State of Illinois, have invented a new and useful Machine or Apparatus for Raking Grain from Harvesters without Hand-Labor; and we do hereby declare the following to be a full and exact description thereof, to wit:

The nature of our invention consists in attaching the rake to any harvester made in the usual form in such a manner that the rake is made to pass over the platform of the harvester from the sickle to the rear of the platform and remove the grain therefrom, then in causing the rake to be elevated from the platform sufficiently to be clear from the grain thrown on the platform while the rake was removing that previously cut, and carried forward thus elevated to a point above or nearly above the sickle, where it is made to descend upon the platform and again pass over it, as before, passing once over the platform and removing the grain back to its starting-point for each revolution of the driving-wheel of the harvester.

Figure 1:
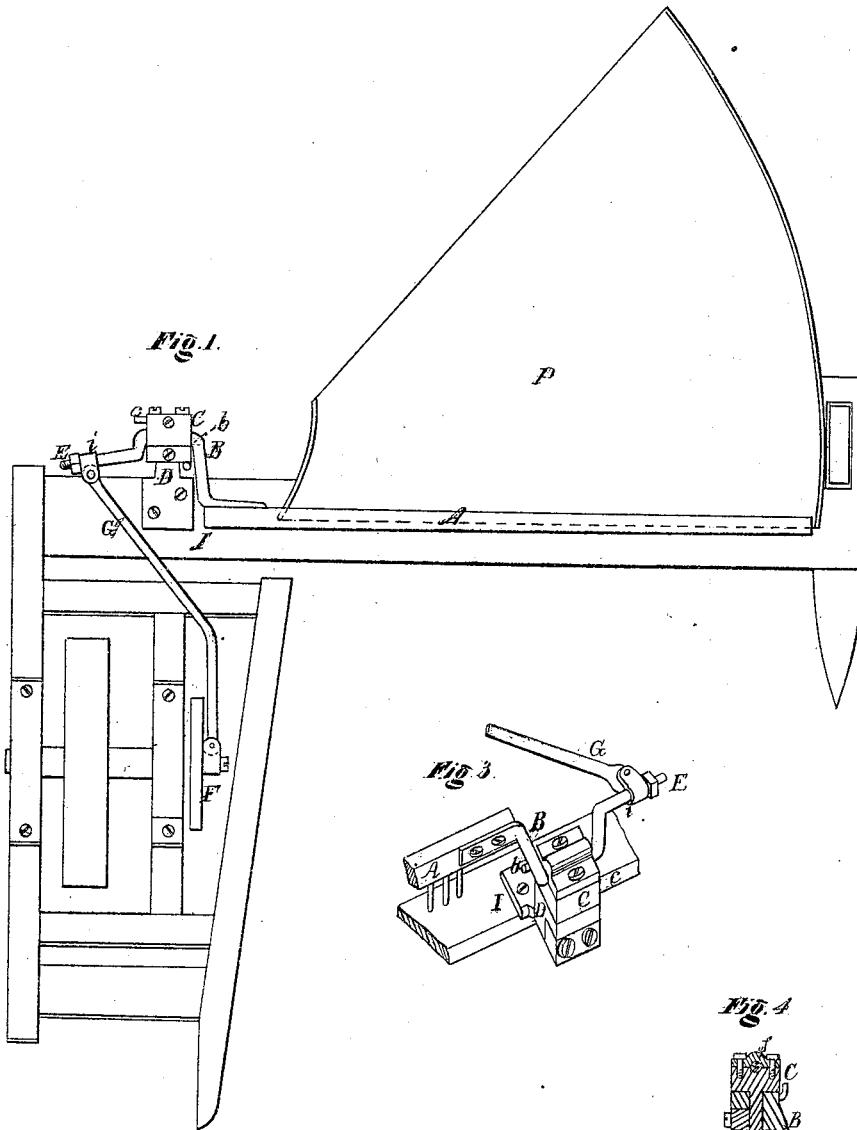
Figure 3:
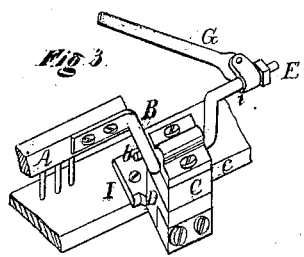
Figure 4:
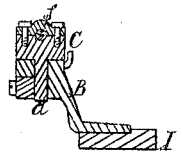
Figure 2:
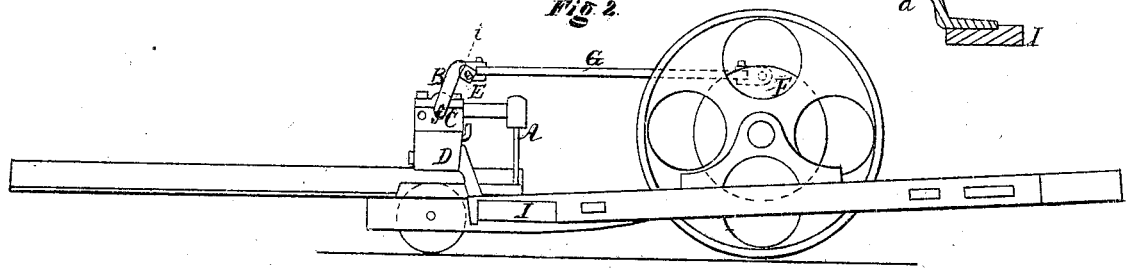

In the annexed drawings, Figure 1 represents a top view of the machine without the cutting arrangement. Fig. 2 is a side view of the same. Fig. 3 is a perspective view of crank-arm, showing its construction and connection. Fig. 4 is a vertical section of crank-arm box and standard on which it rests, taken through axis of swivel-pin.

Similar characters of reference in the several figures denote the same parts.

To enable others skilled in the art to make and use our invention, we will proceed to describe its construction and operation.

We construct our rake in the shape shown in the drawings, and marked A, and attach to one end thereof a double crank-arm of the shape shown in the drawings, and marked B, which crank or arm rests and turns in box marked C, on the lower side of which box is a pin or pivot, $a$, inserted in a socket in the standard attached to the sickle-beam, and marked D.

The end of the arm (marked E) and the wheel of the harvester (marked F) we connect by a pitman of the shape shown in drawings, and marked G, so coupled by a universal joint or other mechanical contrivance to the wheel and arm as to admit of the turning of the wheel and the turning and swaying of the arm.

By the revolving of the driving-wheel of the harvester when the rake is resting on the platform just back of the sickle, and ready to be drawn across the platform and remove the grain, the pitman causes the end of the arm E, to which it is attached, to be drawn toward the harvester, and the journal-box in which the arm rests is made to turn on the pin $a$ in the socket of the standard D, and the rake thereby caused to pass across the platform from the sickle to the farther end of the platform therefrom, at which point the box is kept from turning by the friction on the pin, (which pin runs in a friction-box inserted in the standard,) and the arm then turns sufficiently in the box to elevate the rake clear from the grain thrown by the harvester on the platform, and then drawn forward thus elevated by the turning of the box in the socket of the standard to a point above or nearly above the sickle, where by the turning of the arm it is made to descend again to the platform of the harvester in proper position for being again drawn across the said platform of the harvester for the purpose aforesaid.

We use a pin or stop, $b$, on the side of the box facing the platform, so placed that on the descending of the rake upon the platform it will prevent the arm from turning in the box while the rake is removing the grain from the platform, and also prevent the rake while thus removing the grain from pressing upon the platform.

On the opposite side of the journal-box we use a pin or catch, $c$, so fixed as to prevent the turning of the arm from the point where the rake is elevated for the purpose of being brought forward to the point just above the sickle, where the arm is made to turn again and the rake descends upon the platform.

We make the rake the same length as the sickle of the harvester, of wood sufficiently strong for its purpose.

The double-crank arm we make of wrought-iron (or other suitable material) of about one and one-fourth ($1\frac{1}{4}$) inch in diameter, in shape as follows, as near as can be: From the end of the rake, when resting on the platform just back of the sickle, where attached, it is bent at a right angle thereto and run horizontal therewith, say, six inches, then bent at a right angle to its last direction and run from six to eight inches, (the width of the box C, in which it rests,) and forming the journal $f$ on which the rake is made to work. Then the arm is again bent to an angle a little less than a right angle—say an angle of about eighty-five degrees—with the first and second bend, and not quite perpendicular therefrom, and running about four and one-half inches, and then bent to an angle at a right angle to its then last direction and run about six inches, forming the wrist $i$, by which it is attached to the pitman. For a further illustration of this double-crank arm reference is made to it, as shown in the drawings, and marked B, Fig. 3.

We make the journal-box out of any of the materials in general use for journal-boxes, and in the ordinary manner, and of sufficient length to support the rake, attaching to the lower side thereof a pin or pivot, $a$, to admit of the journal-box turning as desired.

The standard D we attach to the sickle-beam I secure and strong, bracing it firmly to prevent its swaying, and to enable it to support the rake, &c. We make it of wood, facing the top, on which the box rests and turns, with any desirable material to prevent unnecessary friction or wear.

The platform P of the harvester we make of the materials usually employed for that purpose, and of the form shown in the drawings.

We do not claim broadly giving the rake the movements specified when they are effected by two distinct operations, as devices operating in such manner are already patented; but

We claim—

The peculiarly-formed double-crank arm B, connected at opposite extremities with the rake and pitman, and journaled in a swivel-box, C, substantially as described, in combination with the double-jointed pitman G and the studs $b$ and $c$ on the box C, arranged and operating substantially as described.

JACOB V. A. WEMPLE.
ANDREW WEMPLE.

In presence of—
WM. HOPKINS,
M. BURDICK.